United States Patent [19]
Nakaya

[11] Patent Number: 5,483,609
[45] Date of Patent: Jan. 9, 1996

[54] OPTICAL DEVICE WITH MODE ABSORBING FILMS DEPOSITED ON BOTH SIDES OF A WAVEGUIDE

[75] Inventor: Ken-ichi Nakaya, Tokyo, Japan

[73] Assignee: NEC Corporation, Tokyo, Japan

[21] Appl. No.: 272,386

[22] Filed: Jul. 6, 1994

[30] Foreign Application Priority Data

Jul. 9, 1993 [JP] Japan .................. 5-170223

[51] Int. Cl.⁶ .................. G02B 6/126
[52] U.S. Cl. .................. 385/29; 385/2; 385/11; 385/40; 385/129
[58] Field of Search .................. 385/2, 3, 8, 9, 385/10, 11, 15, 27–29, 39–41, 129–132

[56] References Cited

U.S. PATENT DOCUMENTS 4,300,814  11/1981  Carenco ............... 385/132
4,359,260  11/1982  Reinhart et al. ........... 385/11
4,787,691  11/1988  Lorenzo et al. ............ 385/3
4,792,200  12/1988  Amann et al. ......... 385/130 X
5,015,053   5/1991  Johnson ................. 385/2
5,050,947   9/1991  Kawashima et al. ........ 385/9
5,058,971  10/1991  Schmitt et al. ........... 385/11
5,077,822  12/1991  Cremer ................ 385/130
5,276,745   1/1994  Revelli, Jr. ............ 385/8 X

FOREIGN PATENT DOCUMENTS 3-58033  3/1991  Japan .

Primary Examiner—John D. Lee
Attorney, Agent, or Firm—Young & Thompson

[57] ABSTRACT

Side planes of input and output waveguides are exposed in a waveguide type optical device by etching. The exposed side planes are covered with deposited metal films. A TM mode light is propagated through the input and output waveguides without being badly affected by the metal films, but a TM mode light is absorbed by the metal films.

8 Claims, 6 Drawing Sheets

OPTICAL DEVICE WITH MODE ABSORBING FILMS DEPOSITED ON BOTH SIDES OF A WAVEGUIDE

FIELD OF THE INVENTION

The invention relates to a waveguide type optical device, and more particularly to, an optical device which is used as an optical switch, an optical modulator.

BACKGROUND OF THE INVENTION

Description of the Related Art

A conventional waveguide type optical device comprises a $LiNbO_3$ substrate of an electro-optical effect which is cut in Z axis, optical waveguides formed by thermally diffusing Ti into the substrate, a buffer layer of a $SiO_2$ film covering a surface plane of the substrate, and electrodes provided via the buffer layer on the optical waveguides.

In operation, an input light is supplied to a light input port to be introduced into an optical waveguide, and the input light is divided into two lights to be propagated through the optical waveguides. At this time, modulating voltages are applied to the electrodes, so that refractive indexes of the optical waveguides are changed due to the electro-optical effect.

Consequently, a phase difference occurs between the two lights propagating through the optical waveguides, and the two lights having the phase difference are combined to be supplied to a light output port. Thus, an output light which is modulated in intensity dependent on the modulating voltage is obtained at the light output port.

In this waveguide type optical device, however, there is a disadvantage in that a predetermined modulation characteristic (extinction light ratio) is difficult to obtain, because a TE (transverse electric) mode light and a TM (transverse magnetic) mode light tend to copropagate through the optical waveguides. In more detail, a TE mode light having a polarization parallel to the surface plane of the substrate is introduced into the optical waveguide along with a TM mode light having a polarization orthogonal to the surface plane thereof, when a polarization characteristic of a polarization maintaining optical fiber coupled to the light input port is low, or the angle adjustment of the optical fiber and the optical waveguide is not appropriate at the light input port. As known in the art, modulating voltages are different between the TE and TM mode lights to provide a predetermined phase difference. As a result, the above described disadvantage is observed in the conventional waveguide type optical device.

In order to overcome the disadvantage, first and second structures are proposed in the conventional waveguide type optical device.

The first structure is to provide a $SiO_2$ thin film having a refractive index lower than that of the optical waveguide in the vicinity of the light input port to be positioned on the optical waveguide, and a Si thin film having a refractive index higher than that of the optical waveguide on the $SiO_2$ thin film.

In this first structure, the thickness of the $SiO_2$ and Si thin films is adjusted to apply coupling obtained by phase matching between the Si thin film and the optical waveguide only to the TE mode light.

The second structure is to provide a tiny polarizer between the optical fiber and the light input port.

In this second structure, the TE mode light is removed by the tiny polarizer, while the TM mode light is transmitted thorough the polarizer to be introduced into the optical waveguide.

In the first structure, however, there is a disadvantage in that the fabrication of the waveguide type optical device is difficult, because the thickness of each thin film must be precisely controlled. In addition, a thin film thickness which is determined under the condition where only a TE mode light is attenuated is not a practical thickness which is applied to an actual waveguide type optical device.

The second structure has also a disadvantage in that a fabricating process becomes complicated, because the tiny polarizer which is very small in size is fixed at a predetermined position by adhesive, thereby increasing positions on which members are fixed by adhesive. In addition, the number of optically coupling connections is increased to lower the reliability.

SUMMARY OF THE INVENTION

Accordingly, it is an object of the invention to provide a waveguide type optical device in which an unnecessary mode light is removed.

It is a further object of the invention to provide a waveguide type optical device having a simple structure.

It is a still further object of the invention to provide a waveguide type optical device, the fabrication of which does not become difficult.

It is a yet still further object of the invention to provide a waveguide type optical device which is high in reliability.

According to the invention, a waveguide type optical device, comprises:

a substrate having an electro-optical effect;

a waveguide pattern formed on the substrate, the waveguide pattern comprising an input waveguide, an output waveguide, and branched waveguides optically coupled at both ends thereof to the input waveguide and the output waveguide;

a buffer layer formed to cover at least the branched waveguides on the substrate; and electrodes for applying an electric field across the branched waveguides, the electrodes provided on the branched waveguides via the buffer layer;

wherein at least one of the input waveguide and the output waveguide is provided on side planes with metal films.

BRIEF DESCRIPTION OF THE DRAWINGS

The invention will be explained in more detail in conjunction with appended drawings, wherein.

DESCRIPTION OF THE PREFERRED EMBODIMENTS

Before explaining a waveguide type optical device in the preferred embodiment according to the invention, the aforementioned conventional waveguide type optical device will be explained.

Figure 1:
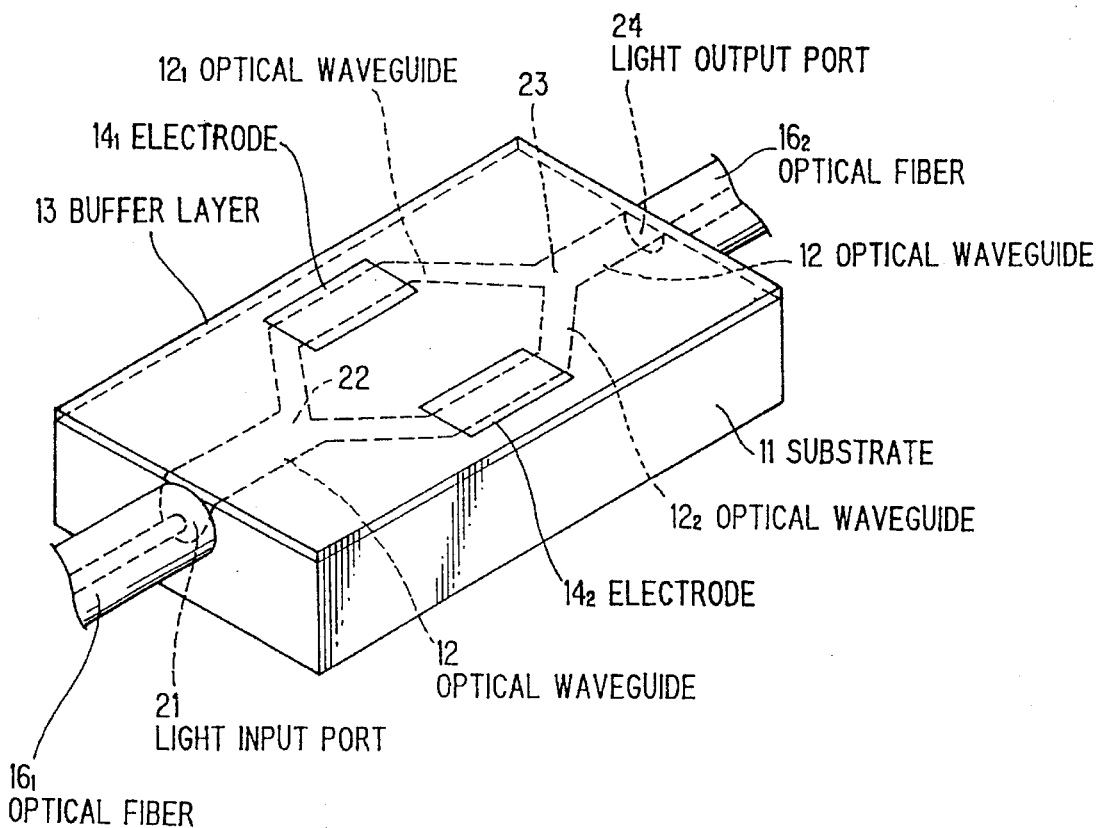
FIG. 1 is a perspective view showing a conventional waveguide type optical device.

FIG. 1 shows the conventional waveguide type optical device which is an optical modulator which comprises a LiNbO$_3$ substrate 11 of an electro-optical effect which is cut in Z axis, optical waveguides 12, 12$_1$ and 12$_2$ formed by thermally diffusing Ti into the substrate 11, a buffer layer 13 of a SiO$_2$ thin film, and electrodes 14$_1$ and 14$_2$ of Au provided via the buffer layer 13 on the optical waveguides 12$_1$ and 12$_2$, wherein polarization maintaining optical fibers 16$_1$ and 16$_2$ are optically coupled to light input and output ports 21 and 24, respectively.

In operation, a light emitted from a light source (not shown) such as a semiconductor laser propagates via the polarization maintaining optical fiber 16$_1$ to be incident to the light input port 21 in the from that a polarization of the input light is orthogonal to the surface plane of the substrate 11, and the input light propagates via the optical waveguide 12 to be divided into first and second lights at the branch portion 22.

At this time, different modulating voltages are applied to the electrodes 14$_1$ and 14$_2$, and the change of refractive indexes occurs in the optical waveguides 12$_1$ and 12$_2$ due to the electro-optical effect of the substrate 11. As a result, a phase difference occurs between the first and second lights propagating via the optical waveguides 12$_1$ and 12$_2$. The first and second lights having the phase difference are combined at a combining portion of the optical waveguides 12$_1$ and 12$_2$, so that the first and second lights interfere with each other to become a light of an intensity modulated by the applied voltages at the light output port 24. Thus, a light signal having the maximum and minimum intensities alternately is obtained at the light output port 24, for instance, when the modulating voltages are alternately applied to the electrodes 14$_1$ and 14$_2$ to alternately generate the phase differences of "0" and "π" between the first and second lights.

The reason why the input light is supplied to the light input port, which that the polarization is orthogonal to the surface plane of the substrate 11, is that a light having the polarization which is a TM (transverse magnetic) mode light is subject to the maximum change of phase (that is, refractive index) in accordance with the application of a unit voltage.

However, if the polarization characteristic of the optical fiber 16$_1$ is low, or the angle adjustment of the optical fiber 16$_1$ and the optical waveguide 12 is not appropriate at the light input port 21, a TE (transverse electric) mode light having a polarization parallel to the surface plane of the substrate 11 is introduced into the optical waveguide 12, so that the TE and TM mode lights copropagate via the optical waveguides 12, 12$_1$ and 12$_2$. As a result, a predetermined modulation characteristic (extinction light ratio) is not obtained, because voltages are different to provide a predetermined phase difference between the TE and TM mode lights.

In more detail, where a polarization characteristic of the polarization maintaining optical fiber 16$_1$ is deteriorated, or the angular adjustment of connecting the polarization maintaining optical fiber 16$_1$ to the optical waveguide 12 is insufficient, a TE mode light is introduced into the optical waveguide 12. A voltage for generating a phase difference between TE mode lights is different from a voltage for generating the same phase difference between TM mode lights. That is, the extinction of a TE mode light is not effected by a voltage necessary for extinction of a TM mode light (a voltage for generating a phase difference of "π" between TM mode lights). For this reason, where a light which is mixed with TE and TM mode lights is introduced into a waveguide type optical modulator, a predetermined modulation characteristic (extinction light ratio) is difficult to be obtained.

Figure 2:
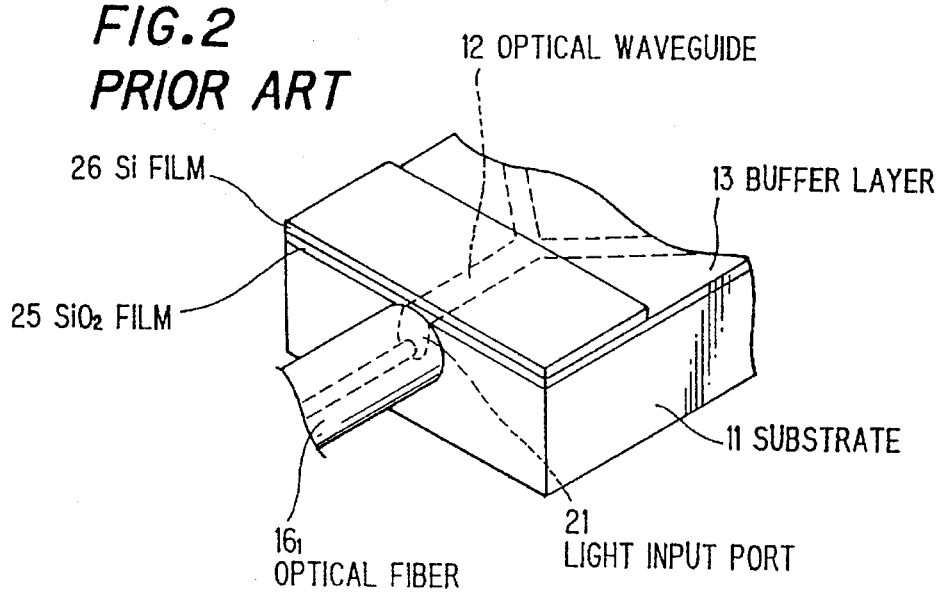
FIG. 2 is a partial perspective view showing a first structure in which the conventional waveguide type optical device is improved.

In order to overcome this disadvantage, a structure in which a SiO$_2$ thin film 25 having a refractive index lower than that of the optical waveguide 12 and a Si thin film 26 having refractive index higher than that of the optical waveguide 12 are provided in the vicinity of the light input port 21 to be positioned on the optical waveguide 12, as shown in FIG. 2 and disclosed in the Japanese Patent Kokai No. 3-58033.

In this structure, the thickness of the SiO$_2$ film 25 and the Si film 26 is adjusted, such that the coupling caused by phase matching occurring between the Si film 26 and the optical waveguide 12 is applied only to the TE mode light which is thereby prevented from being introduced into the waveguide 12.

Figure 3:
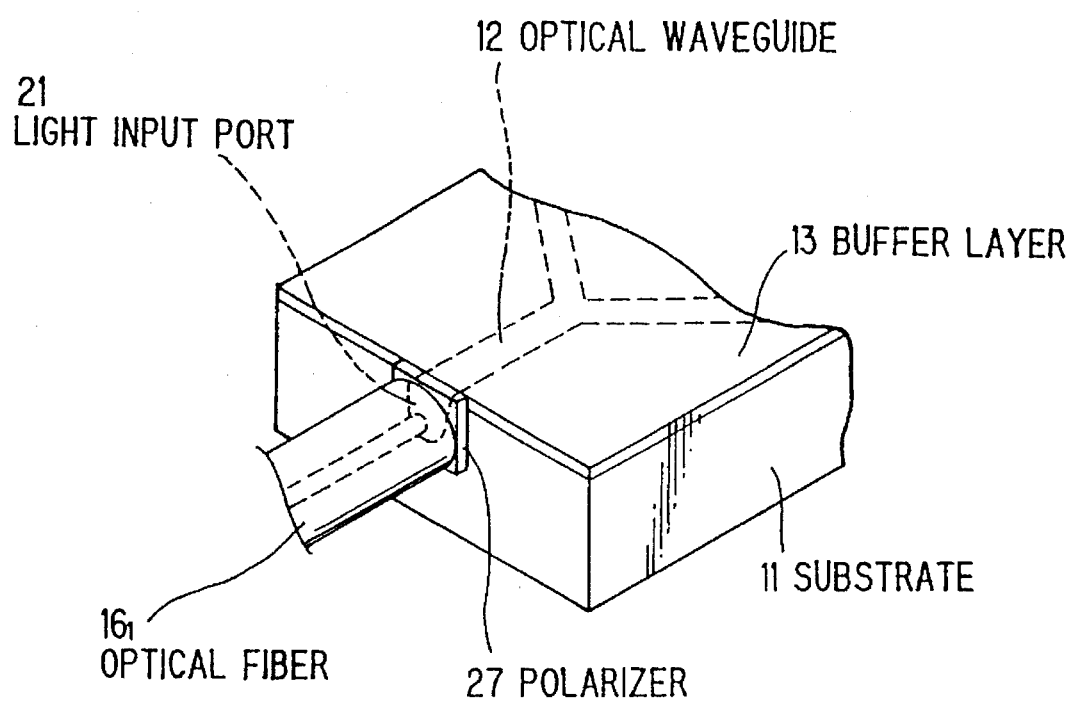
FIG. 3 is a partial perspective view showing a second structure in which the conventional waveguide type optical device is improved.

FIG. 3 shows another structure in which a tiny polarizer 27 is provided between eh optical fibre 16$_1$ and the light input port 21 to remove a TE mode light. In this structure, only a TM mode light is transmitted through the polarizer 27 to be introduced into the optical waveguide 12.

Figure 4A:
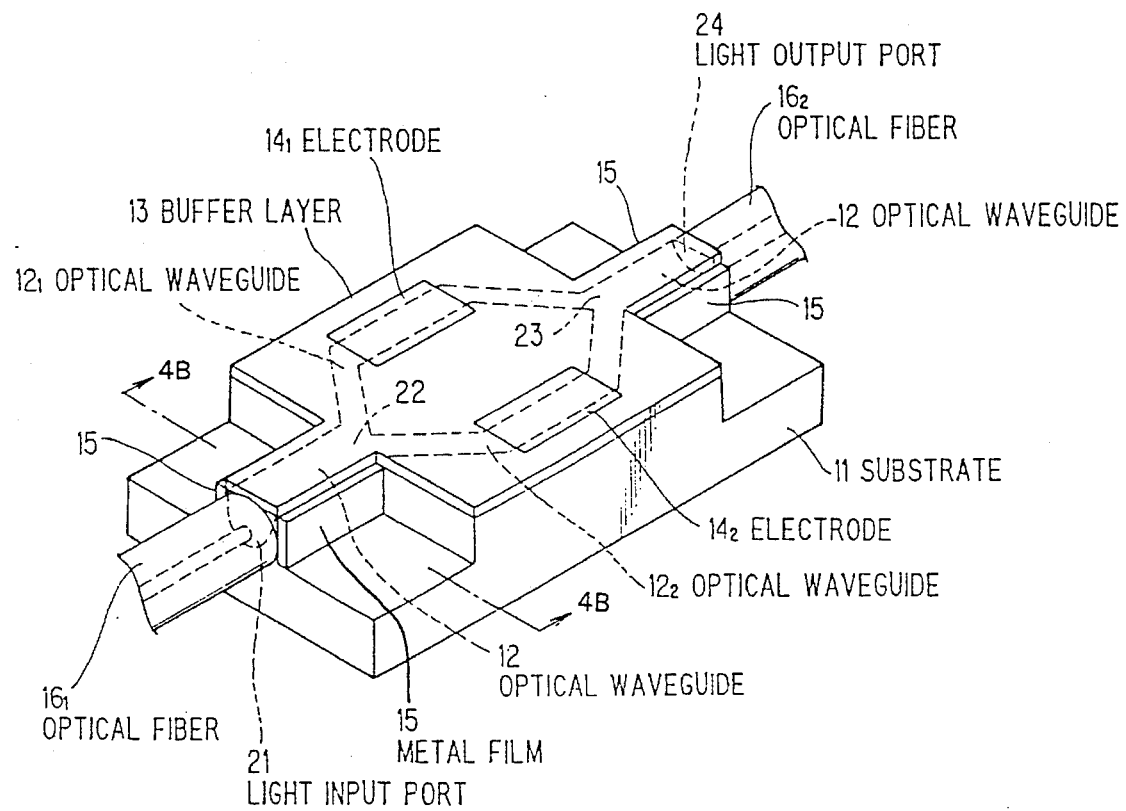
FIG. 4A is a perspective view showing a waveguide type optical device in a preferred embodiment according to the invention.

Next, a waveguide type optical device in the preferred embodiment according to the invention will be explained in FIGS. 4A and 4B, when like parts are indicated by like reference numerals as used in FIGS. 1 to 3.

The waveguide type optical device comprises metal films 15 of Al on the both side planes of the optical waveguides 12 on the input and output sides, while the remaining structure is the same as in FIG. 1.

In operation, a transmission loss is approximately 1 dB for the TM mode light, while that is approximately 30 dB for the TE mode light. That is, even if the TE and TM mode lights are supplied to the waveguide type optical device, the TE mode light is attenuated by the metal films 15, so that the modulation characteristics are not badly affected by the TE mode light.

In the preferred embodiment, the metal films 15 are provided on the input and output sides of the optical device. However, the metal films 15 may be provided on one side of the input and output sides.

The above described waveguide type optical device will be fabricated by the steps as shown in FIGS. 5A and 5B, and FIGS. 6A to 6D.

Figure 5A:
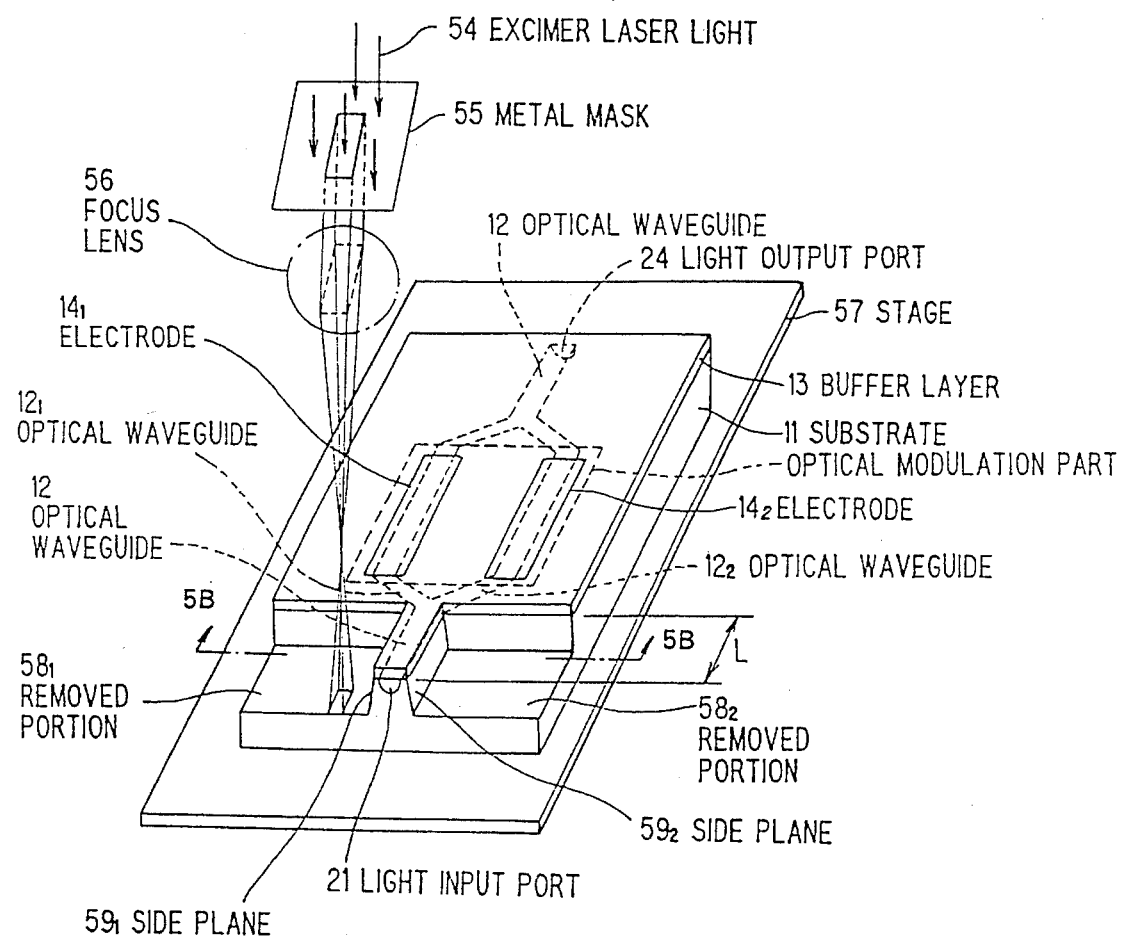
FIG. 5A is a perspective view showing the step of etching a LiNbO$_3$ substrate by the Excimer laser to fabricate the waveguide type optical device in the preferred embodiment.

In FIG. 5A, a Ti film is formed on the LiNbO$_3$ substrate 11 in the thickness of 98 nm by sputtering method, and patterning of the Ti film is carried out to provide a stripe width of 7 μm, an optical waveguide interval of 15 μm in a Mach-Zender branched portion, and a branched length of 25 mm. Then, thermal diffusion is carried out in a humidity atmosphere at 1050° C. for 8 hours to provide the optical waveguides 12, $12_1$ and $12_2$. Further, the $SiO_2$ buffer layer 13 is sputtered in Ar gas atmosphere to avoid the absorption of waveguide lights in the electrodes $14_1$ and $14_2$. Then, Cr/Pt/Au are sputtered by thickness of 30 nm, 30 nm and 300 nm, respectively, and the sputtered layers are patterned to provide the electrodes $14_1$ and $14_2$ on the optical waveguides $12_1$ and $12_2$. Thus, an optical modulation port is obtained. Thereafter, the $LiNbO_3$ substrate 11 is etched in the vicinity of the optical waveguides 12 on the input and output sides by Excimer laser light 54 radiating the $LiNbO_3$ substrate 11 via a metal mask 55 and a focus lens 56. The $LiNbO_3$ substrate 11 is mounted on a stage 57 moving on a horizontal plane, and portions $58_1$ and $58_2$ are removed to provide side planes $59_1$ and $59_2$ of the optical waveguide 12 in accordance with the X and Y horizontal motion of the stage 57.

Figure 5B:
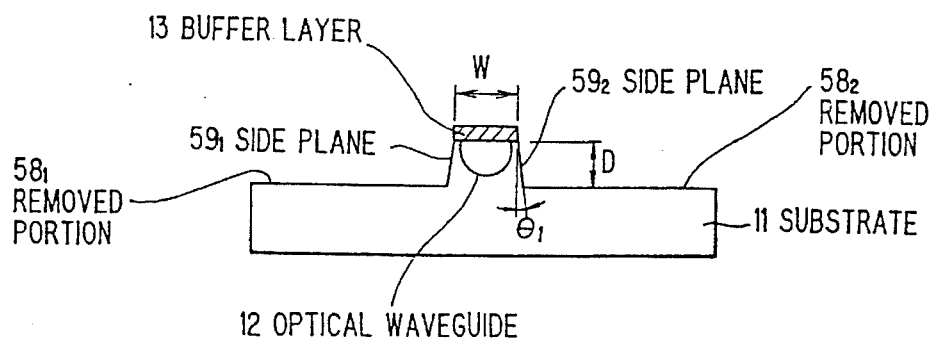
FIG. 5B is a cross-sectional view showing the LiNbO$_3$ substrate taken along the line A—A' in FIG. 5A.
Figure 6A:
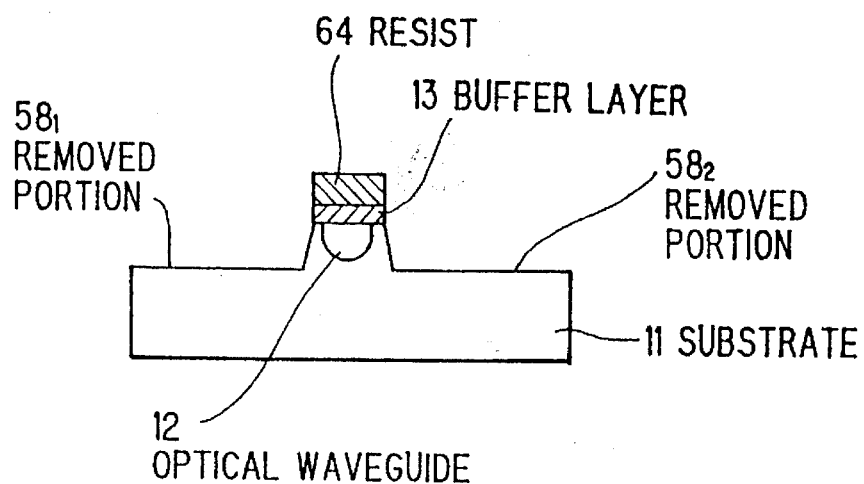
FIGS. 6A to 6D are explanatory diagrams showing the steps of depositing metal films on the sides of an optical waveguide to fabricate the waveguide type optical device in the preferred embodiment.
Figure 6B:
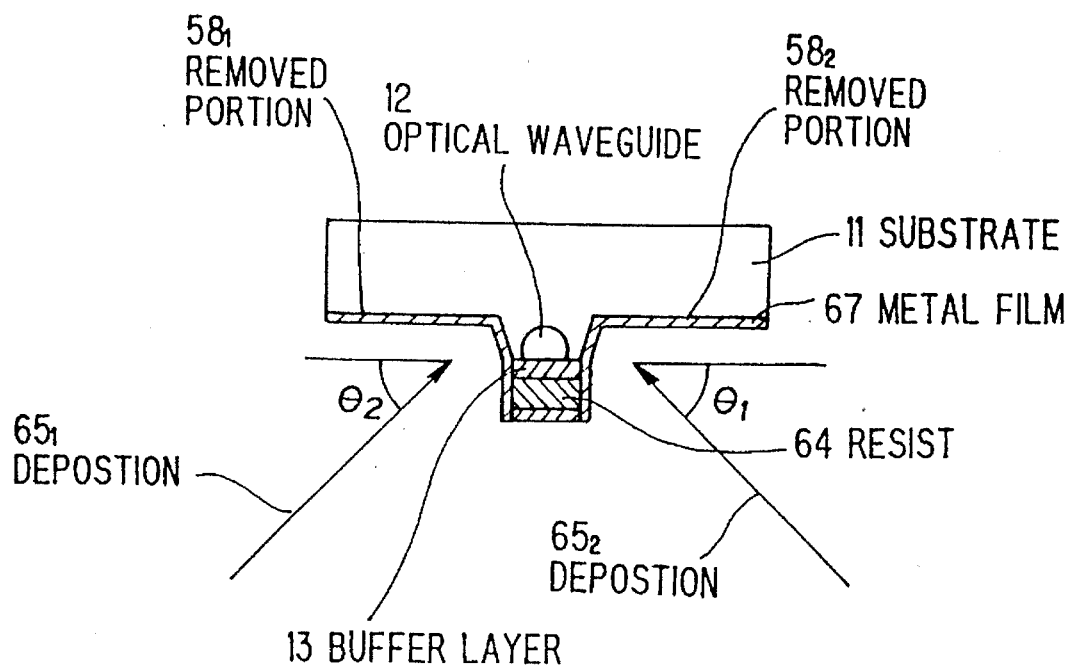
Figure 6C:
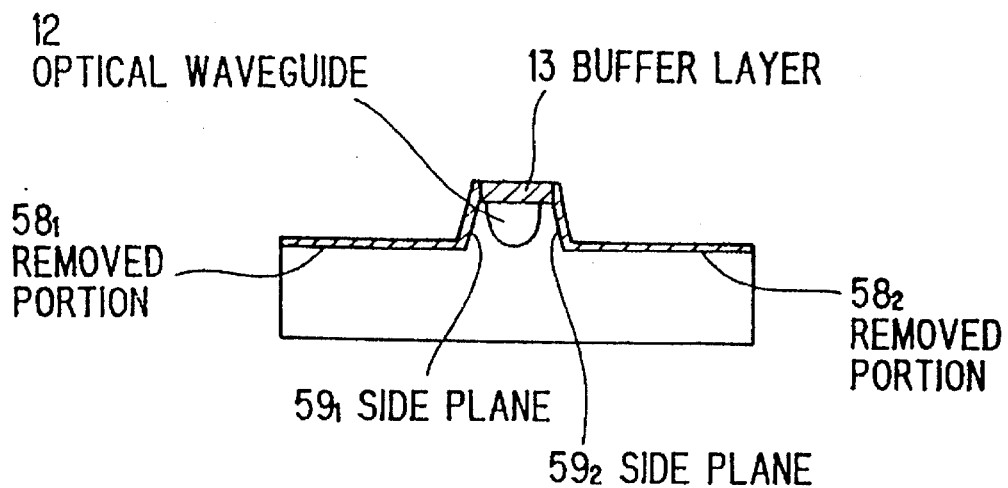
Figure 6D:
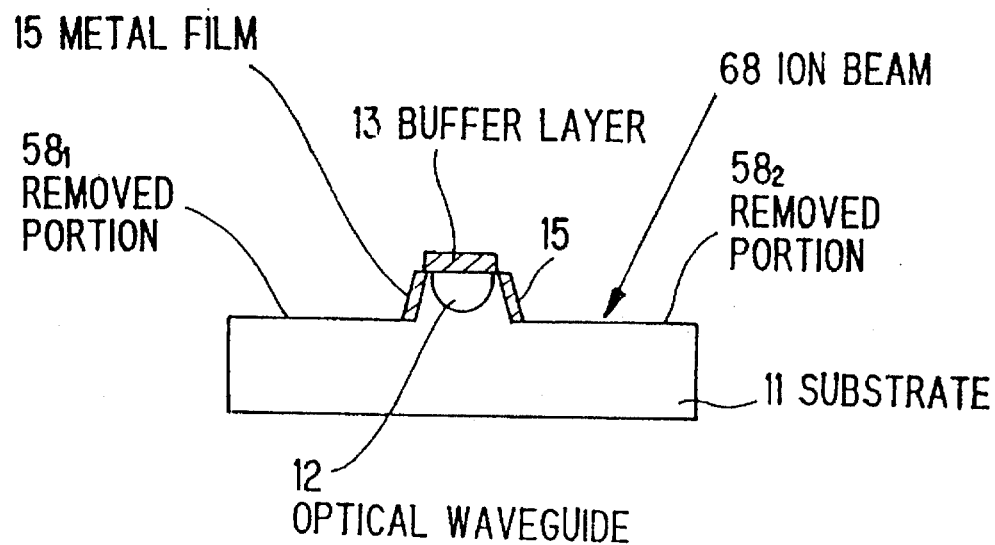

In one example, KrF-Excimer laser is lased with a pulse repetition of 200 Hz and an output energy of 250 mJ, and the metal mask 55 has an aperture of 0.5 mm×1.5 cm. The projecting reduction factor of the laser light 54 is 7.5 times, and an energy density is 5 mj/cm$_2$ on the substrate 11. Consequently, a substrate etching depth D of 10.2 μm, a ridge width W of the optical waveguide 12 is 9.3 μm, a ridge length L of the optical waveguide 12 is 10 mm, and a taper angle $θ_1$ of the optical waveguide side planes $59_1$ and $59_2$ is 8°, are obtained as shown in FIGS. 5A and 5B.

A method for depositing the metal films 15 on the side planes $59_1$ and $59_2$ will be explained in FIGS. 6A to 6D.

A resist is deposited on the substrate 11, and the resist 64 is only left on the buffer layer 13 of the optical waveguide 12 by patterning (6A). Then, the substrate 11 is set in an ion beam deposition apparatus, such that the surface plane of the substrate 11 is positioned with an angel $θ_2$ of 45° relative to directions of a deposition source of Al (6B). Thus, a metal film 67 is deposited to have a thickness of 110 nm by a deposition rate of 1 nm, and is removed on the resist 64 by lifting-off (6C), and on the removed portions $58_1$ and $58_2$ by etching (6D). In accordance with the above described steps, the waveguide type optical device in the preferred embodiment is fabricated as an optical intensity modulator. As a matter of course, this may be fabricated as an optical switch.

Figure 4B:
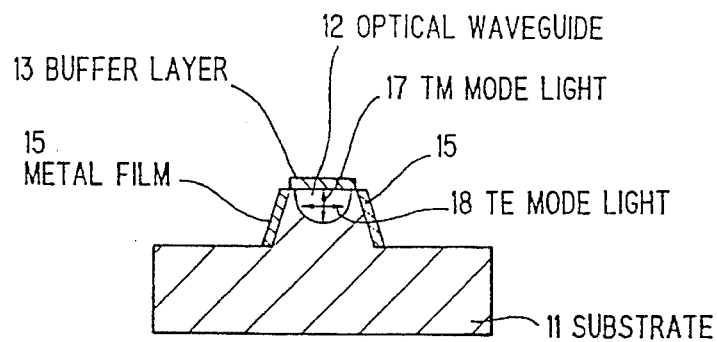
FIG. 4B is a cross-sectional view showing the waveguide type optical device taken along the line A—A' in FIG. 4A.

In the optical intensity modulator using a Z plate $LiNbO_3$ substrate 11, an input light is polarized to provide an electric field component orthogonal to the surface plane of the substrate 11 (TM mode light 17 as shown in FIG. 4B), and, when an electric field is generated in Z axis direction in the optical waveguides $12_1$ and $12_2$, the electro-optical effect of the substrate 11 becomes largest, so that the optical intensity modulator operates with a low voltage.

Both end planes of the $LiNbO_3$ substrate 1 are optically polished, the optical fibers $16_1$ and $16_2$ are optically coupled and fixed to the end planes of the input and output optical waveguides 12.

In this optical intensity modulator thus fabricated, an extinction light ratio is improved from 21 dB in the conventional optical modulator to 43 dB on the light output side. At this time, an excess loss of a TM mode light is increased by 0.8 dB.

In the preferred embodiment, Au, Cu or Cr may be used for the metal films 15 in place of Al.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is
1. A waveguide type optical device, comprising:
a substrate having an electro-optical effect;
a waveguide pattern formed on said substrate, said waveguide pattern comprising an input waveguide, an output waveguide, and branched waveguides optically coupled at both ends thereof to said input waveguide and to said output waveguide;
a buffer layer formed to cover at least said branched waveguides on said substrate; and
electrodes for applying an electric field across said branched waveguides, said electrodes provided on said branched waveguides via said buffer layer;
wherein at least one of said input waveguide and said output waveguide is provided on side planes with metal films.

2. A waveguide type optical device, according to claim 1, wherein said metal films are made of a metal selected from the group consisting of Al, Au, Cu and Cr.

3. A waveguide type optical device, according to claim 1, wherein said substrate is of $LiNbO_3$.

4. A waveguide type optical device, according to claim 1, wherein said metal films do not substantially absorb a TM mode light, but a TE mode light, where said TM mode light is a light having an electric field component parallel to a surface of said substrate, and a TE mode light is a light having an electric field component vertical to said surface of said substrate.

5. A waveguide type optical device, comprising:
a substrate having an electro-optical effect;
a waveguide pattern formed on said substrate, said waveguide pattern comprising an input waveguide, an output waveguide, and branched waveguides optically coupled at both ends thereof to said input waveguide and to said output waveguide;
a buffer layer formed to cover at least said branched waveguides on said substrate, wherein at least one of said input waveguide and said output waveguide is etched to a predetermined etching depth, to thereby form at least one of a ridge-type input waveguide having side planes and a ridge-type output waveguide having side planes; and
electrodes for applying an electric field across said branched waveguides, said electrodes being provided on said branched waveguides via said buffer layer;
wherein at least one of said ridge-type input waveguide and said ridge-type output waveguide is provided with metal films on said side planes.

6. A waveguide type optical device, according to claim 5, wherein said metal films are made of a metal selected from the group consisting of Al, Au, Cu and Cr.

7. A waveguide type optical device, according to claim 5, wherein said substrate is of $LiNbO_3$.

8. A waveguide type optical device, according to claim 5, wherein said metal films do not substantially absorb a TM mode light, but a TE mode light, where said TM mode light is a light having all electric field component parallel to a surface of said substrate, and a TE mode light is a light having an electric field component vertical to said surface of said substrate.

* * * * *